(12) United States Patent
Asada et al.

(10) Patent No.: US 7,740,407 B2
(45) Date of Patent: *Jun. 22, 2010

(54) HYDRODYNAMIC BEARING TYPE ROTARY DEVICE AND RECORDING AND REPRODUCTION APPARATUS INCLUDING THE SAME

(75) Inventors: Takafumi Asada, Osaka (JP); Hiroaki Saito, Ehime (JP); Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 657 days.

This patent is subject to a terminal disclaimer.

(21) Appl. No.: 11/785,186

(22) Filed: Apr. 16, 2007

(65) Prior Publication Data

US 2007/0253650 A1 Nov. 1, 2007

(30) Foreign Application Priority Data

Apr. 21, 2006 (JP) ............................. 2006-117603

(51) Int. Cl.
*F16C 32/06* (2006.01)
(52) U.S. Cl. ...................................... 384/107; 384/119
(58) Field of Classification Search ................. 384/100, 384/107, 119; 360/99.08, 98.07
See application file for complete search history.

(56) References Cited

U.S. PATENT DOCUMENTS 6,717,310 B2 * 4/2004 Yoshikawa et al. ............ 310/90
7,021,829 B2    4/2006 Tamaoka
7,092,203 B2    8/2006 Inoue et al.
7,204,642 B2 * 4/2007 Kodama ...................... 384/107
7,556,433 B2 * 7/2009 Kurimura et al. ............ 384/107
2006/0051001 A1 * 3/2006 Nishimura et al. .......... 384/100
2007/0280571 A1 * 12/2007 Satoji et al. .................. 384/243

FOREIGN PATENT DOCUMENTS

JP      2003-88033      3/2003
JP      2005-45876      2/2005

* cited by examiner

*Primary Examiner*—Thomas R Hannon
(74) *Attorney, Agent, or Firm*—Wenderoth, Lind & Ponack L.L.P.

(57) ABSTRACT

To prevent air from being trapped inside a bearing and causing the bearing to have oil film rupture and NRRO to deteriorate. In a hydrodynamic bearing, a first lubricant reservoir is provided in a gap between a lower surface of a hub and a sleeve, and a second lubricant reservoir is provided in a gap between an outer peripheral surface of the sleeve and an inner peripheral surface of the hub or an inner peripheral surface of a stopper member fixed to the hub. If air enters inside such a hydrodynamic bearing, the air has to be discharged. For this purpose, the relationship in widths of the radial bearing gap, the maximum gap of the first lubricant reservoir under the lower surface of the hub and the maximum gap of the second lubricant reservoir on the sleeve outer peripheral surface, or the relationship in magnitudes of capillary forces thereof is adjusted. The principle that air tends to move toward the portion having smaller capillary pressure is utilized to make it difficult for the air to be trapped inside the bearing and to smoothly discharge the air from a gas-liquid interface of the second lubricant reservoir.

12 Claims, 15 Drawing Sheets

HYDRODYNAMIC BEARING TYPE ROTARY DEVICE AND RECORDING AND REPRODUCTION APPARATUS INCLUDING THE SAME

BACKGROUND

I. Technical Field

The present invention relates to a hydrodynamic bearing type rotary device using a hydrodynamic bearing and a recording and reproducing apparatus including the same.

II. Background Art

In recent years, recording and reproducing apparatuses and the like using discs to be rotated have experienced an increase in memory capacity and an increase in the transfer rate for data. Thus, bearings used for such recording and reproducing apparatuses are required to have high performance and high reliability to constantly rotate a disc load with high accuracy. Accordingly, hydrodynamic bearings suitable for high-speed rotation are used for such rotary devices.

The hydrodynamic bearing type rotary device has a lubricant, such as oil between a shaft and a sleeve, and generates a pumping pressure by hydrodynamic grooves during rotation. Thus, the shaft rotates in a non-contact state with respect to the sleeve in the hydrodynamic bearing type rotary device so it is suitable for high-speed rotation.

Hereinafter, an example of conventional hydrodynamic bearing type rotary devices will be described with reference to FIGS. 13 through 15. As shown in FIG. 13, a conventional hydrodynamic bearing type rotary device includes a sleeve 21, a shaft 22, a stopper 23, a bottom plate 24, oil 25, a hub 27, a base plate 28, a rotor magnet 29, a stator 30, and a disc 31.

The shaft 22 is press-fitted to the hub 27. The shaft 22 is inserted into a bearing hole 21A of the sleeve 21 so as to be rotatable. On at least one of an outer peripheral surface of the shaft 22 and an inner peripheral surface of the sleeve 21, radial hydrodynamic grooves 21B are formed to form a radial bearing surface. On a surface of the sleeve 21 opposing a lower surface of the hub 27, thrust hydrodynamic grooves 21D having a spiral pattern as shown in FIG. 14 are formed to form a thrust bearing surface. The bottom plate 24 shown in FIG. 13 is adhered to the sleeve 21. The sleeve 21 has a flange portion 21C on an outer peripheral surface on the side facing the hub 27. The flange portion 21C has a large diameter and a tapered surface 21E on a surface on the side of the base plate 28. An oil reservoir 26 is provided between the tapered surface 21E and a substantially circular stopper 23 fixed to the hub 27. The stopper 23 is engaged to the flange portion 21C of the sleeve 21. The oil 25 is sealed in the bearing cavity entirely, and a gas-liquid interface is formed near the oil reservoir 26.

To the base plate 28, the sleeve 21 is fixed. The stator 30 is also fixed to the base plate 28 so as to oppose the rotor magnet 29. Magnetic centers of the rotor magnet 29 and the stator 30 in an axial direction are largely shifted in the axial direction. Thus, the rotor magnet can generate an attraction force in a direction indicated by arrow A in the figure. To the hub 27, the rotor magnet 29 and the disc 31 are fixed.

Operations of the conventional hydrodynamic bearing type rotary device having the above-described structure are as follow. In the conventional hydrodynamic bearing type rotary device shown in FIG. 13, when an electric current is supplied to a coil wound around the stator 30, a rotary magnetic field is generated, and a rotary force is applied to the rotor magnet 29. Thus, the rotor magnet 29 starts to rotate with the hub 27, the shaft 22, the stopper 23, and the disc 31. When these members rotate, the hydrodynamic grooves 21B gather the oil 25 filled in the radial gap to generate a pumping pressure between the shaft 22 and the sleeve 21, forming a radial bearing. The thrust hydrodynamic grooves 21D gather the oil 25, and generate a pumping pressure in a thrust direction between the hub 27 and the sleeve 21. The rotating part is caused to float in a direction opposing the attraction force of the rotor magnet 29 which is indicated by arrow A in the figure, and is started to rotate in a non-contact state.

As described above, the shaft 22 can rotate in a non-contact state with respect to the sleeve 21 and the bottom plate 24. With a magnetic head or an optical head (not shown), data can be recorded/reproduced to/from a rotating disc 31.

However, in the above conventional hydrodynamic bearing type rotary device, air 32 may be trapped in a gap between a lower end surface of the hub 27 and the sleeve 21, as shown in FIG. 15 (S1 and S2 in the figure) and may not be discharged.

More specifically, in a hydrodynamic bearing, a pressure in the bearing cavity varies due to functions of hydrodynamic grooves 21D and 21B. When a large amount of air is trapped within the bearing cavity, the air 32 may expand due to pressure change, and cause the oil 25 to flow out from the oil reservoir 26. Once the oil 25 flows out from the oil reservoir 26, it may result in oil film rupture in the hydrodynamic grooves 21D and 21B. In such a case, problems, such as the required performance not being achieved, the bearing being worn and broken, and the like may occur.

It has been recognized that, if the maximum gap S1 is too large, bubbles (air) 32 tend to accumulate. However, actually, the cause of the bubbles being trapped in the bearing cavity cannot be attributed simply to the width of the gap. Conventionally, it has been impossible to anticipate movement which ensures the bubbles 32 to be discharged or to explain how easy the bubbles 32 can be trapped in the bearing.

SUMMARY OF THE INVENTION

An object of the present invention is to provide a hydrodynamic bearing type rotary device which can efficiently discharge bubbles generated within the bearing cavity to prevent deterioration of the bearing performance and problems, such as malfunction of the bearing portion and the like.

A hydrodynamic bearing type rotary device according to a first aspect of the invention includes a sleeve, a shaft, a hub, a first lubricant reservoir, a radial bearing and a second lubricant reservoir. The sleeve has a bearing hole. The shaft is inserted into the bearing hole of the sleeve so as to be rotatable. The hub is attached to one end of the shaft. The first lubricant reservoir is formed between the hub and an end surface of the sleeve and has a maximum gap s1. The radial bearing has radial hydrodynamic grooves formed on at least one of an outer peripheral surface of the shaft or an inner peripheral surface of the sleeve, and has a gap g1. The second lubricant reservoir has a maximum gap g2 between an outer peripheral surface of the sleeve, and an inner peripheral surface of the hub having an inner diameter slightly larger than the outer peripheral surface of the sleeve or an inner peripheral surface of a stopper member attached to the hub. A lubricant is held in the radial bearing, the first lubricant reservoir and the second lubricant reservoir. Parameters which indicate capillary pressures of the gaps (Pg1, Ps1, Pg2) have the relationship which satisfy the following relational expression (B):

$$Pg1 > Ps1 > Pg2 \qquad \text{(B), in which,}$$

when the lubricant reservoir has a substantially tubular shape, Pg1 and Pg2 are defined as follows:

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m], and when the lubricant reservoir has a substantially thin disc shape, Ps1 is defined as follows:

$$Fs1 = 2\pi \times Ds \times \gamma \times \cos\theta \quad (7)$$

$$As1 = \pi \times Ds \times S1 \quad (8)$$

$$Ps1 = Fs1/As1 \quad (9)$$

Ds: Inner diameter of lubricant reservoir having maximum gap S1 [m]
S1: Maximum gap of the lubricant reservoir between sleeve and hub [m].

In such an example, in the radial bearing gap, the gap of the lubricant reservoir on the sleeve outer peripheral surface and a lubricant flow path provided therebetween, parameters indicating capillary pressures at respective portions are intentionally set to have different magnitudes.

In this way, the principle that air tends to move from a portion having a larger parameter indicating the capillary pressure toward a portion having a smaller parameter is utilized to make it difficult for the air to be trapped inside the bearing and to smoothly discharge the air. As a result, it becomes possible to prevent deterioration in the bearing performance or problems, such as oil film rupture or the like at hydrodynamic grooves due to the discharge of the lubricant to the outside, which is caused by expansion of the bubbles in the bearing cavity.

A hydrodynamic bearing type rotary device according to a second aspect of the invention includes a sleeve, a shaft, a hub, a first lubricant reservoir, a radial bearing and a second lubricant reservoir. The sleeve has a bearing hole. The shaft is inserted into the bearing hole of the sleeve so as to be rotatable. The hub is attached to one end of the shaft. The first lubricant reservoir is formed between the hub and an end surface of the sleeve and has a maximum gap s1. The radial bearing has radial hydrodynamic grooves formed on at least one of an outer peripheral surface of the shaft or an inner peripheral surface of the sleeve, and has a gap g1. The second lubricant reservoir has a maximum gap g2 between an outer peripheral surface of the sleeve, and an inner peripheral surface of the hub having an inner diameter slightly larger than the outer peripheral surface of the sleeve or an inner peripheral surface of a stopper member attached to the hub. A lubricant is held in the radial bearing, the first lubricant reservoir and the second lubricant reservoir. The gaps (g1, s1, g2) have widths which satisfy the following relational expression (A):

$$g1 < s1 < g2 \quad (A).$$

In such an example, in the radial bearing gap, the gap of the lubricant reservoir on the sleeve outer peripheral surface and a lubricant flow path provided therebetween, optimal widths of the respective portions are intentionally set to have different magnitudes.

In this way, the principle that air tends to move from a portion having a larger capillary pressure toward a portion having a smaller capillary force is utilized to make it difficult for the air to be trapped inside the bearing and to smoothly discharge the air. As a result, it becomes possible to prevent deterioration in the bearing performance or problems, such as oil film rupture or the like at hydrodynamic grooves due to the discharge of the lubricant to the outside, which is caused by expansion of the bubbles in the bearing cavity.

The hydrodynamic bearing type rotary device according to a third aspect of the invention is a hydrodynamic bearing type rotary device of the first or second aspects of the invention, in which another end of the shaft is processed to have a surface with substantially right angles to an axis. A thrust plate provided so as to oppose the surface is fixed to the sleeve to form a thrust bearing surface. Hydrodynamic grooves holding a lubricant are formed on at least one of these opposing surfaces.

In such an example, hydrodynamic grooves which form a thrust hydrodynamic surface are formed on at least one of the surfaces of the thrust plate and another end of the shaft, which oppose one another.

In this way, irrespective of a surface on which hydrodynamic grooves which form the thrust hydrodynamic surface are formed, the principle that air tends to move from a portion having a larger capillary pressure toward a portion having a smaller capillary force is utilized to make it difficult for the air to be trapped inside the bearing and to smoothly discharge the air as described above.

The hydrodynamic bearing type rotary device of according to a fourth aspect of the invention is a hydrodynamic bearing type rotary device of the first or second invention, in which a flange is attached to another end of the shaft. One surface of the flange has a second thrust bearing surface which opposes a lower end surface of the sleeve. Another surface of the flange has a first thrust bearing surface which opposes the thrust plate. The thrust plate is fixed to the sleeve, and has hydrodynamic grooves for holding the lubricant on at least one of these opposing surfaces.

In such an example, hydrodynamic grooves which form a thrust hydrodynamic surface are formed on at least one of surfaces of the thrust plate and another end of the shaft, which oppose one another.

In this way, irrespective of a surface on which hydrodynamic grooves which form the thrust hydrodynamic surface formed on the opposing surfaces of the flange and the sleeve are formed, the principle that air tends to move from a portion having a larger capillary pressure toward a portion having a smaller capillary force is utilized to make it difficult for the air to be trapped inside the bearing and to smoothly discharge the air as described above.

The hydrodynamic bearing type rotary device according to a fifth aspect of the invention is a hydrodynamic bearing type rotary device of the first or second aspects of the invention, comprising hydrodynamic grooves on at least one of a surface of the hub and the sleeve upper end surface which oppose one another to form a third thrust bearing surface.

In such an example, hydrodynamic grooves which form a thrust hydrodynamic surface are formed on at least one of surfaces of the hub and the sleeve which oppose one another.

In this way, irrespective of a surface on which hydrodynamic grooves which form the thrust hydrodynamic surface are formed, the principle that air tends to move from a portion having a larger capillary pressure toward a portion having a smaller capillary force is utilized to make it difficult for the air to be trapped inside the bearing and to smoothly discharge the air as described above.

The hydrodynamic bearing type rotary device according to a sixth aspect of the invention is a hydrodynamic bearing type rotary device of any one of the first through fifth aspects of the inventions, including at least one communication hole provided substantially parallel to the bearing hole with the radial hydrodynamic grooves communicating with both ends thereof. At least the communication hole and the radial hydrodynamic grooves form a circulation passage into which the lubricant is injected and circulates therethrough. Further, the radial hydrodynamic grooves are formed in an asymmetrical groove pattern which generates a force to carry the lubricant.

In such an example, the communication hole is formed substantially parallel to the sleeve, and radial hydrodynamic grooves are in an asymmetrical pattern.

With such a structure, surface tension of the lubricant makes it difficult for the bubbles to enter the gap between the bearing hole, and a pumping effect of the radial hydrodynamic grooves discharge the bubbles outside the grooves. As a result, a condition that the radial hydrodynamic grooves can be readily filled with the lubricant can be provided.

A recording and reproducing apparatus according to a seventh aspect of the invention includes the hydrodynamic bearing type rotary device of any one of the first through sixth aspects of the inventions.

According to the present invention, in a hydrodynamic bearing, a first lubricant reservoir is provided in a gap between a lower surface of a hub and a sleeve, and a second lubricant reservoir is provided in a gap between an outer peripheral surface of the sleeve and an inner peripheral surface of the hub or an inner peripheral surface of a stopper member fixed to the hub. If air is generated or enters inside such a hydrodynamic bearing, the air has to be discharged. For this purpose, the relationships in parameters indicating capillary pressures and widths of the radial bearing gap, the maximum gap of the first lubricant reservoir under the lower surface of the hub and the maximum gap of the second lubricant reservoir on the sleeve outer peripheral surface are adjusted. The principle that air tends to move toward the portion having smaller capillary pressure is utilized to make it difficult for the air to be trapped inside the bearing and to smoothly discharge the air from a gas-liquid interface of the lubricant reservoir. In this way, oil film rupture at hydrodynamic grooves and/or deterioration of NRRO can be prevented. A hydrodynamic bearing rotary device with a long life and high reliability can be realized.

DETAILED DESCRIPTION OF THE INVENTION

Hereinafter, an embodiment which specifically shows the best mode for carrying out the invention will be described with reference to the drawings.

First Example

An exemplary hydrodynamic bearing type rotary device of the present embodiment will be described with reference to FIGS. 1 through 10.

Figure 1:
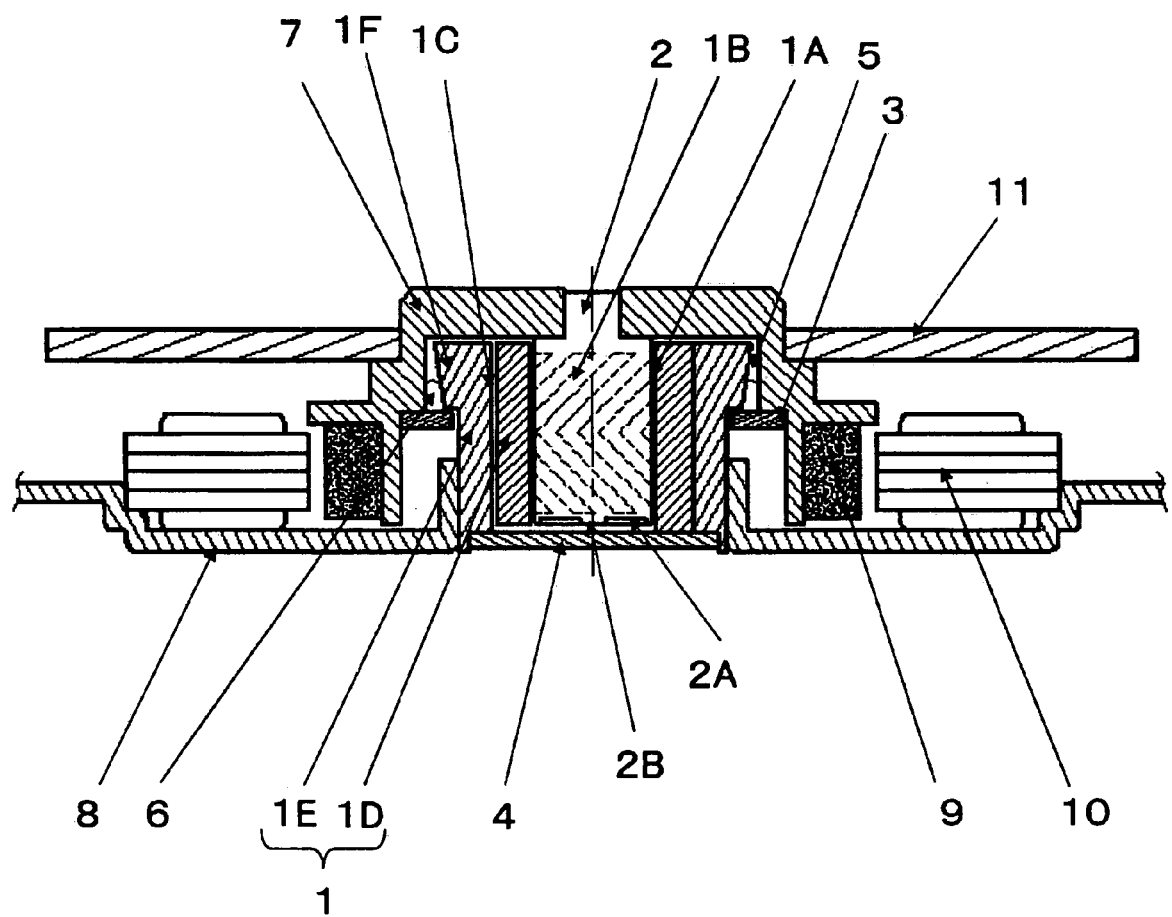
FIG. 1 is a cross-sectional view of a hydrodynamic bearing according to first embodiment of the present invention.

As shown in FIG. 1, the hydrodynamic bearing type rotary device according to the present embodiment includes a sleeve 1, a shaft 2, a stopper member 3, a thrust plate 4, a lubricant 5 such as oil, high-fluidity grease, ionic liquids or the like, a hub 7, a base plate 8, a rotor magnet 9, and a stator 10.

The shaft 2 is fixed integrally with the hub 7 having a shape substantially like a cup and a disc receiving surface to which a disc can be loaded. The shaft 2 is inserted into a bearing hole 1A of the sleeve 1 so as to be rotatable. On at least one of an outer peripheral surface of the shaft 2 and an inner peripheral surface of the sleeve 1, radial hydrodynamic grooves 1B are formed. A lower end surface 2B of the rotary shaft 2 is processed to have a right angle with respect to the axis. The lower end surface 2B is provided so as to oppose the thrust plate 4. On at least one of these opposing surfaces, thrust hydrodynamic grooves 2A are formed. The thrust plate 4 is fixed to the sleeve 1 by a method such as caulking, adhering, or the like. At least a bearing gap near the hydrodynamic grooves 1B and 2A is filled with the lubricant 5 such as oil, high-fluidity grease, ionic liquids or the like. Also, the entire bearing gap having a shape like a bag formed by the sleeve 1 and the shaft 2, the lubricant 5 is filled as necessary. A communication hole 1C is a communication path provided so as to connect the radial hydrodynamic grooves and a first lubricant reservoir on the lower surface of the hub 7. The sleeve 1 has a flange portion 1F on an outer peripheral surface near the hub 7. The flange portion 1F is engaged to the stopper member 3 fixed to the hub 7 and prevents the shaft 2 and the hub 7 from being removed from the sleeve 1. The flange portion 1F has an inclined surface. A gap facing this portion is a second lubricant reservoir 6 where the lubricant 5 is held. The second lubricant reservoir 6 forms a seal portion for a lubricant which prevents the lubricant in the bearing from leaking out.

To the base plate 8, the sleeve 1 is fixed by adhering or the like. The stator 10 is also fixed to the base plate 8 by adhering or the like so as to oppose the rotor magnet 9.

On the other hand, the hub 7 is fixed to the shaft 2. To the hub 7, the rotor magnet 9 is fixed by adhering or the like, and a disc 11 is fixed by disc fixing means such as a clamper (not shown).

A magnetic center of the rotor magnet 9 in the axial direction and a magnetic center of the stator 10 in the axial direction are shifted downward in the axial direction. In this way, an attraction force for attracting the rotating portion such as hub toward the base can be generated. The magnetic centers of the rotor magnet 9 and the stator 10 in the axial direction may be provided at almost same position.

A lower end surface of the rotor magnet 9 is placed so as to oppose the base 8, which is a magnetic member, in the axial direction to generate the attraction force for attracting the rotating portion such as hub toward the base. When the base 8 is not a magnetic member, for example, an attraction plate (not shown) may be fixed to a position on the base 8 which opposes the lower end surface of the rotor magnet 9 by adhering or the like to generate the attraction force. The attraction plate may be a magnetic member having a ring shape. Actually, in order to reduce vibration noises, a subtle adjustment in a vertical direction along the axis direction may be made when the device is designed. Thus, in many cases, the above two methods are both used. In the following description, an example in which the attraction force is generated by the rotor magnet 9 and the base 8 will be described.

Operations of the hydrodynamic bearing type rotary device of the present embodiment which has the above-described structure are as follow.

Figure 2:
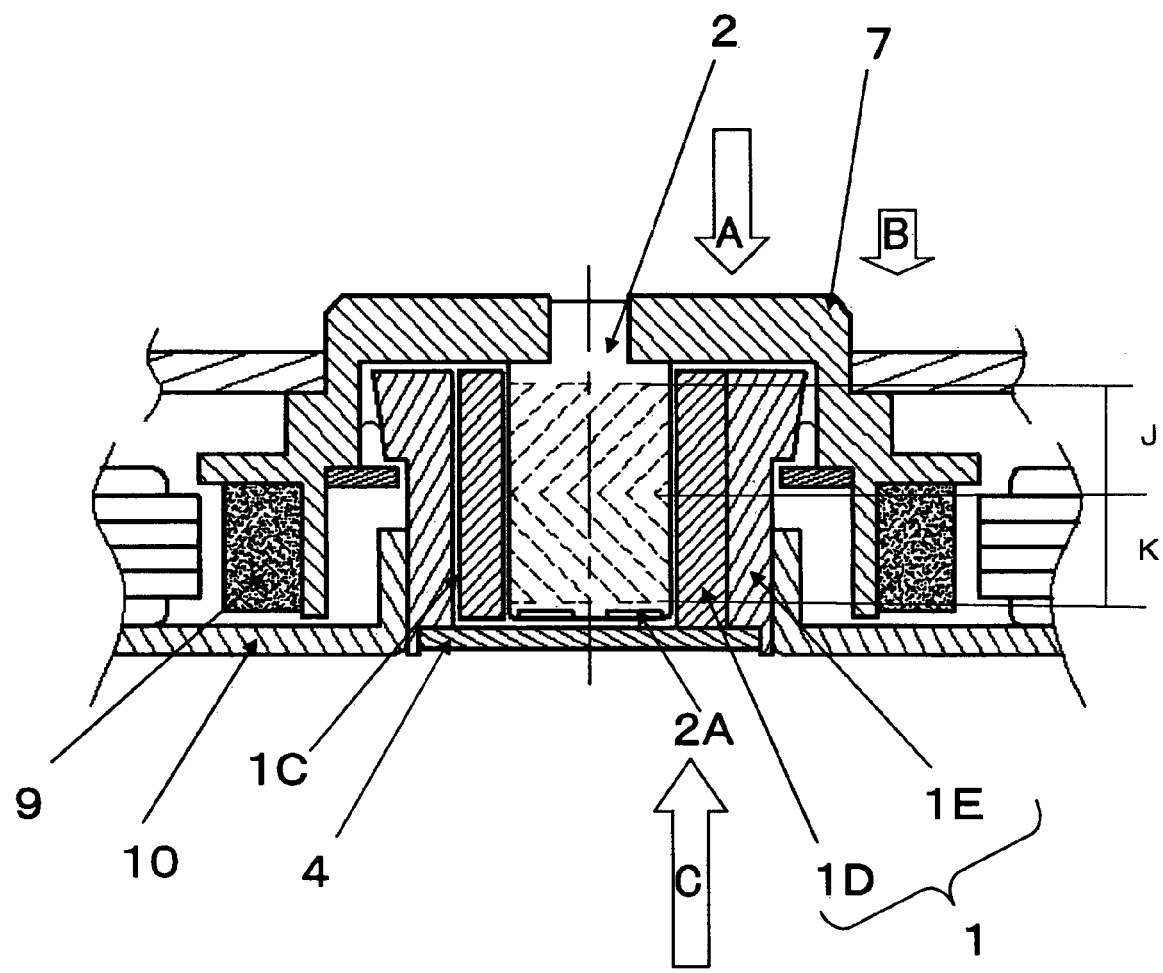
FIG. 2 is a detailed cross sectional diagram of the hydrodynamic bearing.
Figure 3:
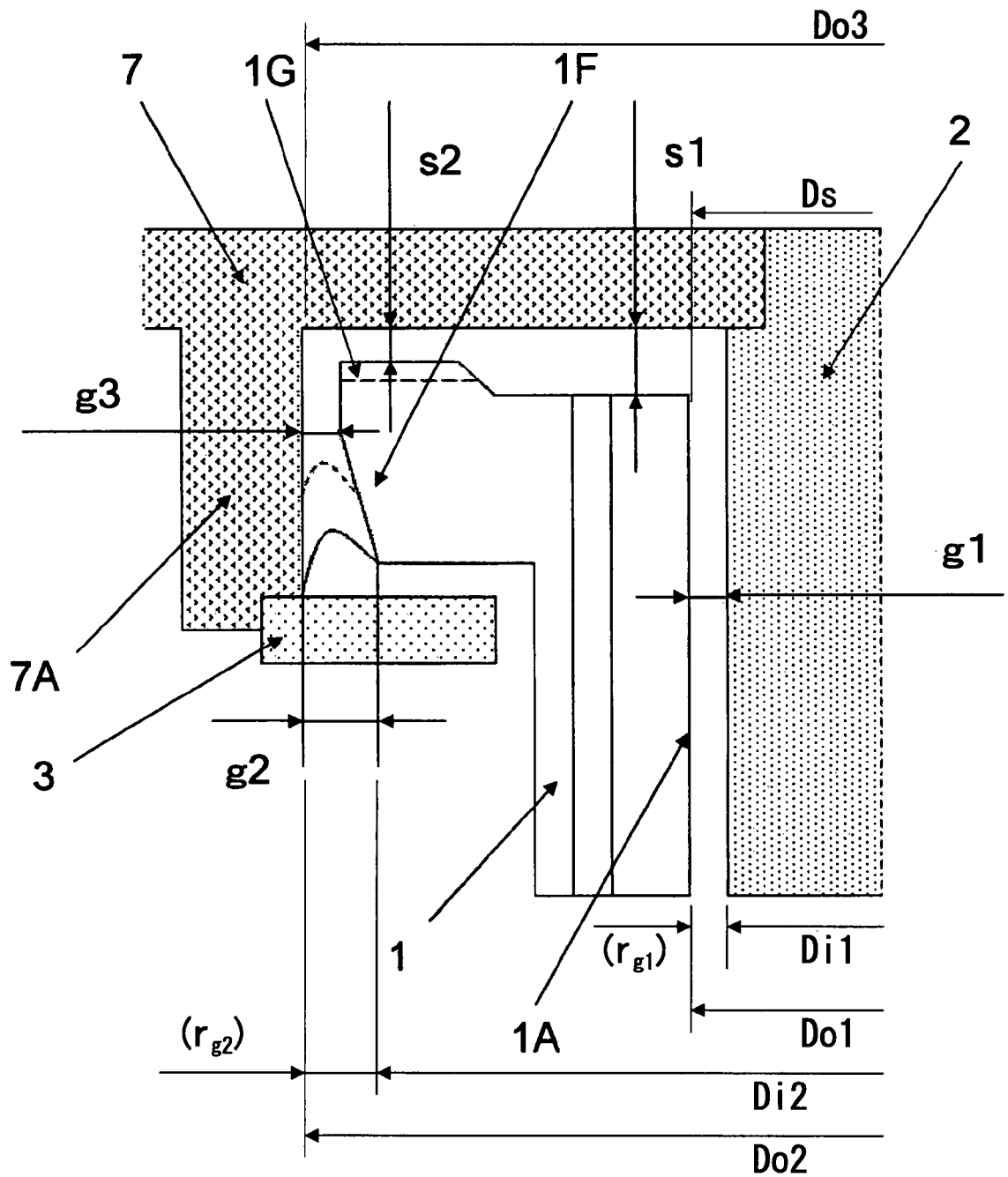
FIG. 3 is a detailed diagram of an oil reservoir portion of the hydrodynamic bearing.

As shown in FIGS. 1 through 3, in the hydrodynamic bearing type rotary device of the present invention, when an electric current is supplied to a coil wound around the stator 10, a rotary magnetic field is generated and a rotary force is applied to the rotor magnet 9. This causes the rotor magnet 9 to start rotating with the hub 7, the shaft 2, the stopper member 3, and the disc 11. As these members rotate, hydrodynamic grooves 1B and 2A gather the lubricant 5 filled in the bearing gap. Accordingly, pumping pressures are generated between the shaft 2 and the sleeve 1, and between the shaft 2 and the thrust plate 4.

As shown in FIG. 2, the rotor magnet 9 and the base 8 generate a force attracting the rotor magnet 9 in the direction indicated by arrow A in the figure. Further, the empty weight of the rotating part is applied in the direction indicated by arrow B. On the other hand, the hydrodynamic pressure by the thrust hydrodynamic grooves 2A is applied in the direction indicated by arrow C in the figure. In such an example, a floating force of the thrust hydrodynamic grooves 2A is automatically adjusted such that the relationship A+B=C is satisfied. Thus, floating level (oil film thickness) is automatically defined.

As shown in FIGS. 1 and 2, the hydrodynamic grooves 1B form a herringbone pattern. The pattern is asymmetrical, and a pattern length J on the upper side in the axial direction and a pattern length K on the lower side satisfy the relationship J>K, for example. In such an example, a pumping pressure working in the axial direction works so as to carry the lubricant 5. On the other hand, the lubricant 5 moves in the bearing hole 1A from the upper side to the lower side as shown in the figure. The lubricant 5 flows into the communication hole 1C or the first lubricant reservoir under the lower surface of the hub 7 and circulates. Thus, no oil rupture occurs at the hydrodynamic grooves 1B. If the pattern length J on the upper side in the axial direction and a pattern length K on the lower side satisfy the relationship J<K, the lubricant 5 moves in an opposite direction, but similar effects are achieved.

As shown in FIG. 3, a gap between the shaft 2 and the bearing hole 1A is referred to as g1, a maximum gap portion of a gap between the lower surface of the hub 7 and the sleeve 1 is referred to as s1 and a maximum gap of the second lubricant reservoir (oil reservoir) 6 is referred to as g2. Widths of the gaps are set so as to satisfy the relationship g1<s1<g2. Maintaining this relationship makes it difficult for the bubbles 12 included in the lubricant 5 to enter the gap g1 of the bearing hole 1A. Furthermore, if the communication hole 1C is formed in the sleeve 1 near the bearing hole 1A and the radial hydrodynamic grooves 1B have the asymmetrical pattern as shown in FIG. 2, surface tension of the lubricant makes it difficult for the bubbles 12 to enter the gap g1 in the bearing hole 1A. Also, the pumping function of asymmetrical grooves 1B discharges the bubbles 12 outside the groove. As a result, a condition that the radial hydrodynamic grooves 1B are readily filled with the lubricant can be provided.

Conventionally, in order to discharge air in the bearing cavity, the widths of respective gaps of the bearing and the relationship among them have been considered. However, by only considering the gap widths, it is difficult to precisely grasp the conditions which allow air to be discharged. Regarding this point, the present inventors found that conditions which prevent the bubbles 12 from entering the bearing gap can be set precisely by having parameters representing capillary pressures, which will be shown below, satisfying a certain relationship.

In this way, hydrodynamic bearings which have widths or capillary pressures of the bearing portions which do not exist conventionally can be formed. The present invention employs parameters which indicate a capillary phenomenon. Such parameters correspond to capillary pressure. In the following description, they are described as capillary pressures.

Figure 4:
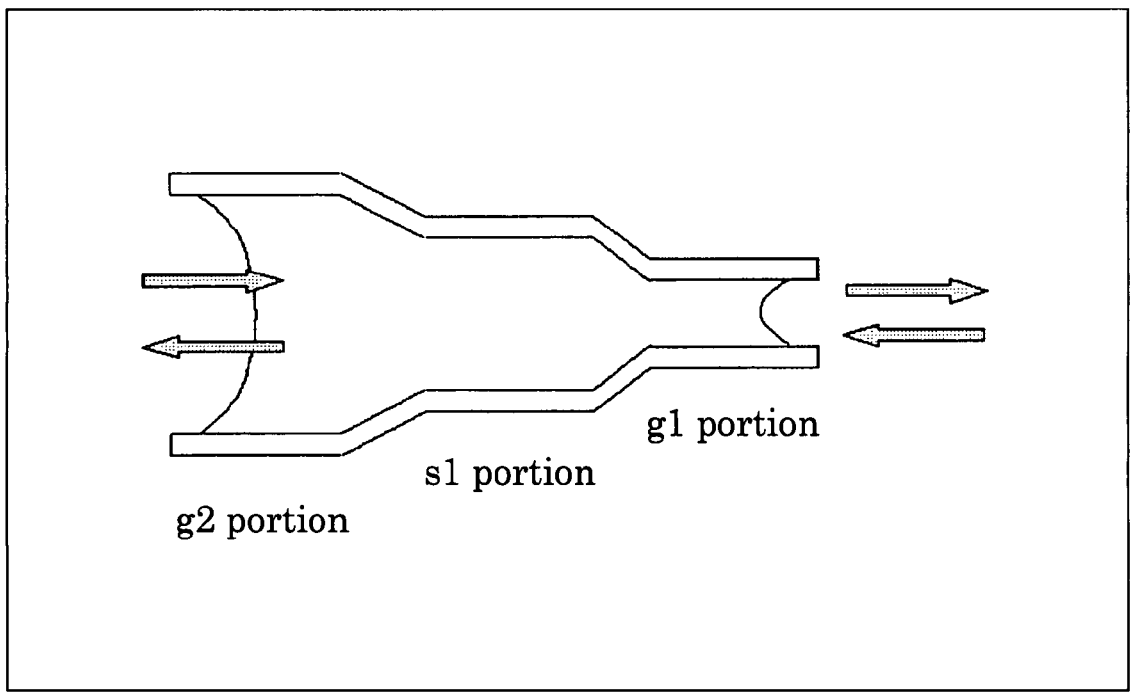
FIG. 4 is an image diagram showing a tubular path of the hydrodynamic bearing.
Figure 5:
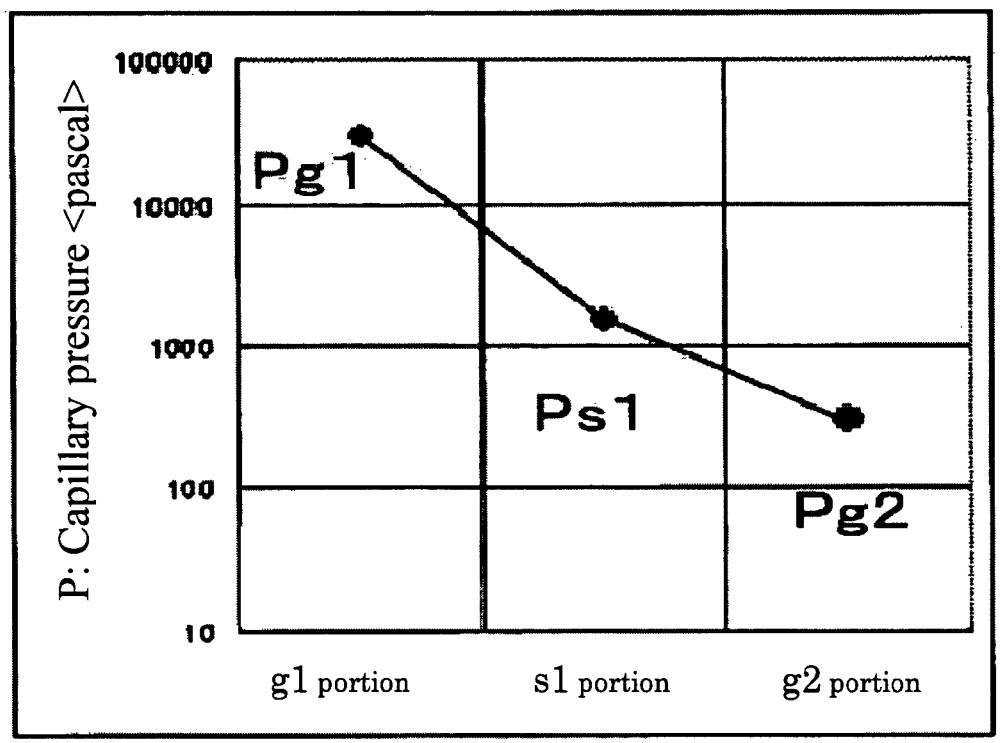
FIG. 5 is a capillary pressure chart of the hydrodynamic bearing.
Figure 7:
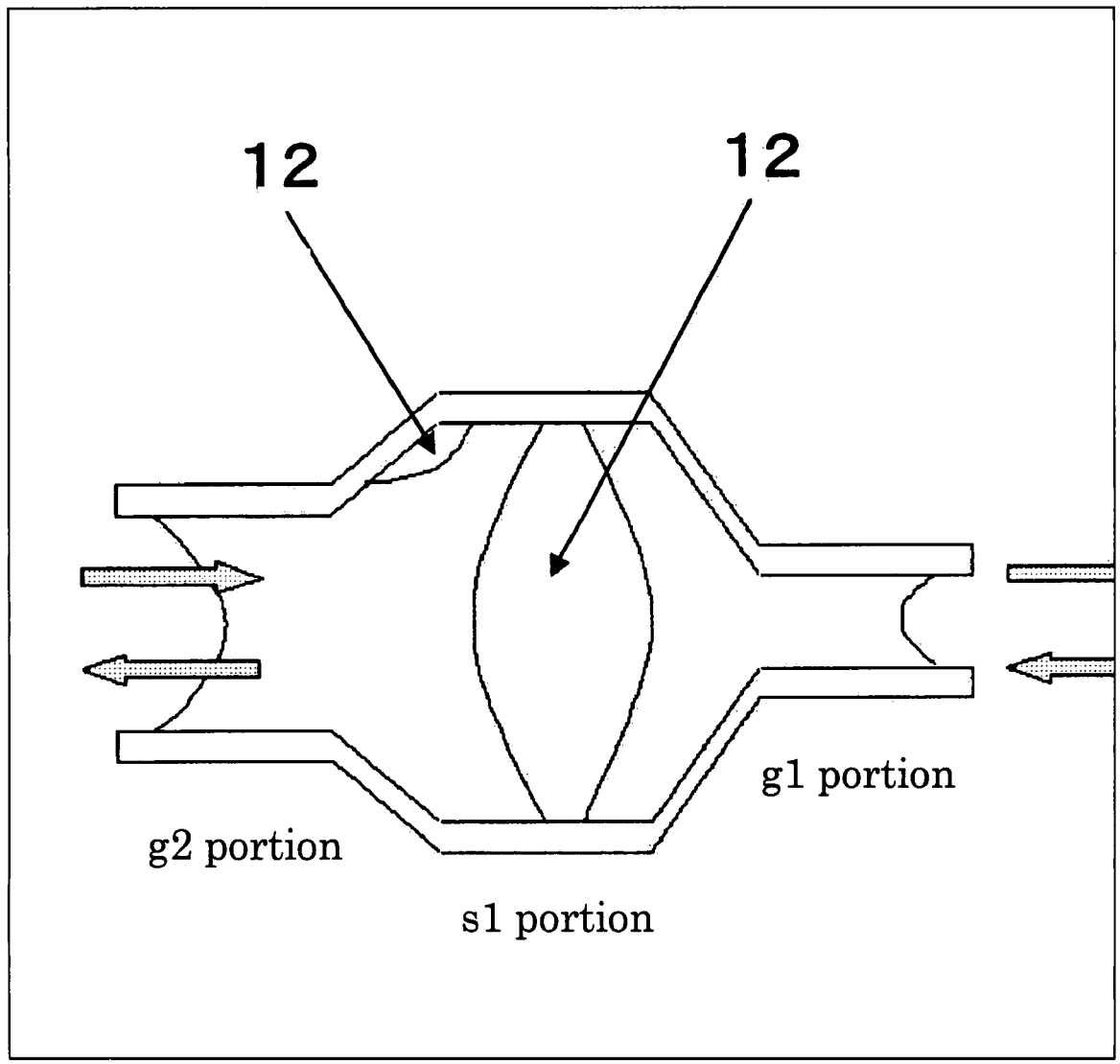
FIG. 7 is a diagram illustrating capillary pressures.

FIG. 3 is a detailed diagram of the second lubricating reservoir (oil reservoir) 6. As shown in FIG. 3, the lubricant 5 is held in the gap defined by an outer peripheral surface of the flange portion 1F and an inner tube portion 7A of the hub 7. The gap between the shaft 2 and the bearing hole 1A is referred to as g1, and a capillary pressure applied to the gap is referred to as Pg1. The maximum gap portion of the gap between the lower surface of the hub 7 and the upper end surface of the sleeve 1 is referred to as S1; the minimum gap thereof is referred to as S2. A capillary pressure applied to the S1 portion is referred to as Ps1. Further, the minimum portion of the second lubricating reservoir (oil reservoir) 6 is referred to as g3; the maximum portion thereof is referred to as g2. The capillary pressure applied to the g2 portion is referred to as Pg2. As shown in an image diagram of a tubular path of the present embodiment, when a volume of air in the bearing capacity changes, or a difference is generated between a pressure inside the bearing and the pressure outside the bearing, the lubricant 5 moves through the tubular path. If the tubular path has a shape as shown in FIG. 4, the lubricant can move through the tubular path smoothly. Thus, bubbles can move smoothly in the opposite direction and no air accumulates in the tubular path. However, the tubular path may have a different shape, for example, a shape as shown in an image diagram of FIG. 7. FIG. 7 shows the tubular path of FIG. 13 which has a conventional design. In this tubular path, the capillary pressure of the S1 portion in the middle of the tubular path is small. It is found that such a shape causes the air 12 to accumulate in the middle of the tubular path, or to be difficult to be discharged. In the present embodiment shown in FIGS. 1 and 2, as shown in FIG. 5, the capillary pressures of the portions g1, S1, and g2 satisfy the relationship:

$Pg1>Ps1>Pg2.$

Figure 6:
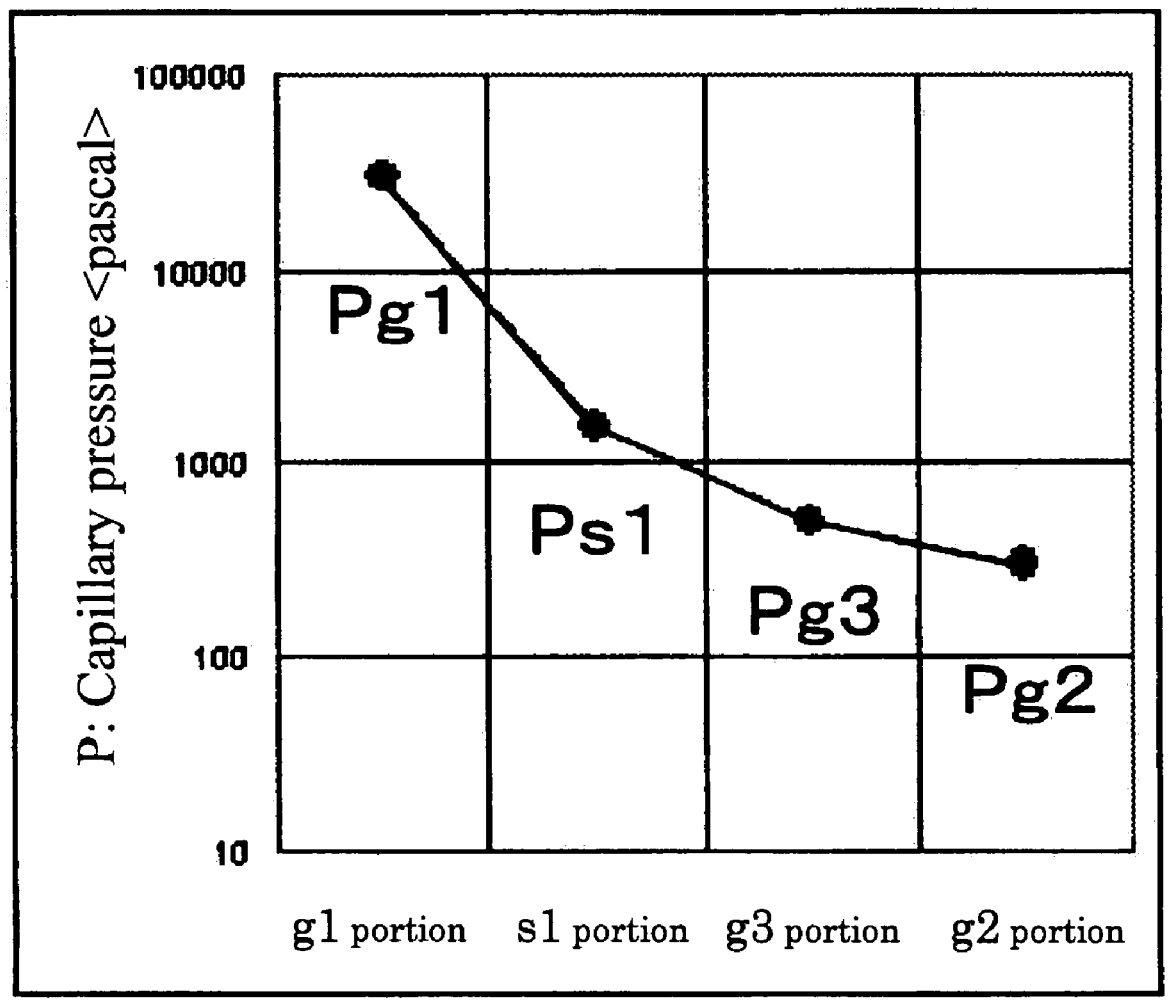
FIG. 6 is a capillary pressure chart of the hydrodynamic bearing.

Alternatively, as shown in FIG. 6, they satisfy the relationship:

$Pg1>Ps1$ and $Pg3>Pg2.$

Figure 8:
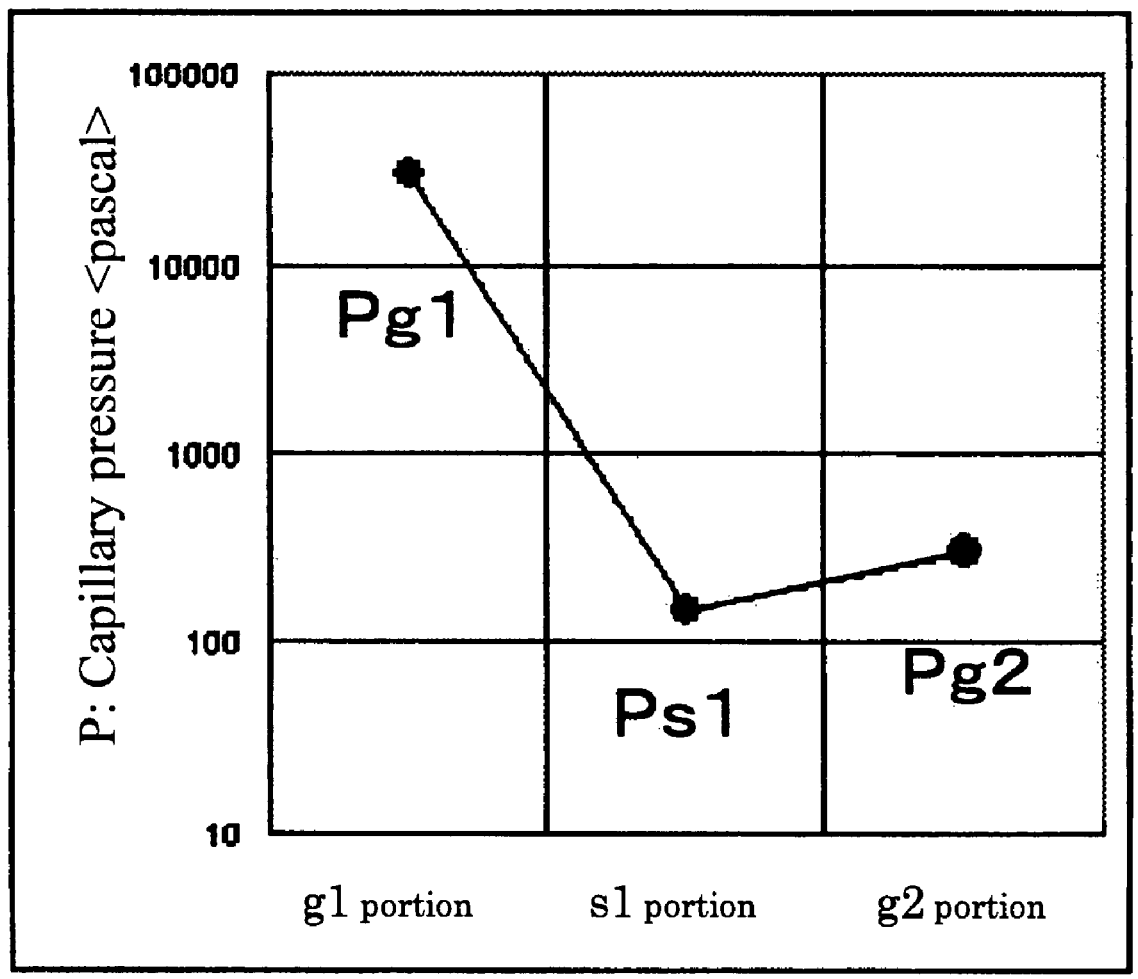
FIG. 8 is a diagram illustrating capillary pressures.

FIG. 8 shows capillary pressures at respective portions in FIG. 7. It is shown that it is difficult to discharge the air 12 toward the g2 portion since the relationship Pg1>Ps1>Pg2 is not satisfied.

Figure 9:
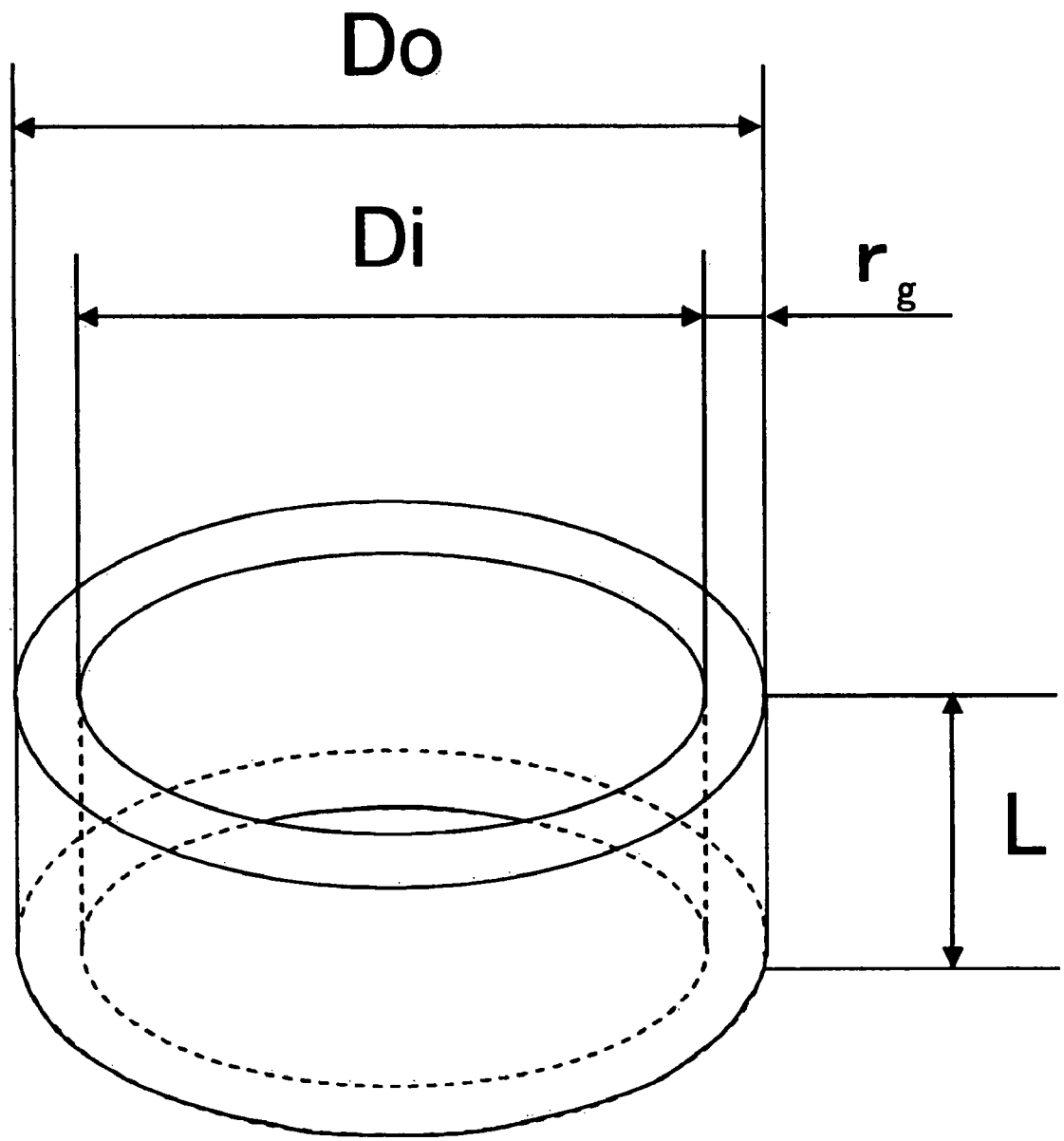
FIG. 9 is a diagram defining capillary pressures.

FIG. 9 shows shapes of the gaps g1 and g2 in FIG. 3. Capillary pressures in such an example (Pg1 and Pg2) are defined by following equation set 1.

Regarding Pg1, since the radial bearing gap g1 has a substantially tubular shape, an outer diameter of the tube Do1 corresponds to an inner diameter of the sleeve 1 and an inner diameter Di1 corresponds to an outer diameter of the shaft 2. Regarding Pg2, since the second lubricant reservoir 6 has a tubular shape having an inner diameter with an inclination, it is considered to have a shape substantially tubular with a width g2. An outer diameter Do2 of the tube corresponds to the inner diameter of the inner tubular portion of the hub 7; an inner diameter Di2 of the tube corresponds to an outer diameter of the flange portion 1F (see FIGS. 3 and 9).

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m]
Pg: Capillary pressure [pascal]

Specifically, when γ=0.0288 [N/m], θ=0.2269 [radian], Do1=0.0033 [m], and rg1=0.000002 [m], Pg1 is a pressure about 28000 [pascal]. When Do2=0.0036 [m] and rg2=0.000070 [m], Pg2 is a pressure of about 800 [pascal].

Herein, oil film thickness rg1 and rg2 is calculated on the premises that they are equal to the radial bearing gap g1 and the maximum gap g2 of the second lubricant reservoir.

Figure 10:
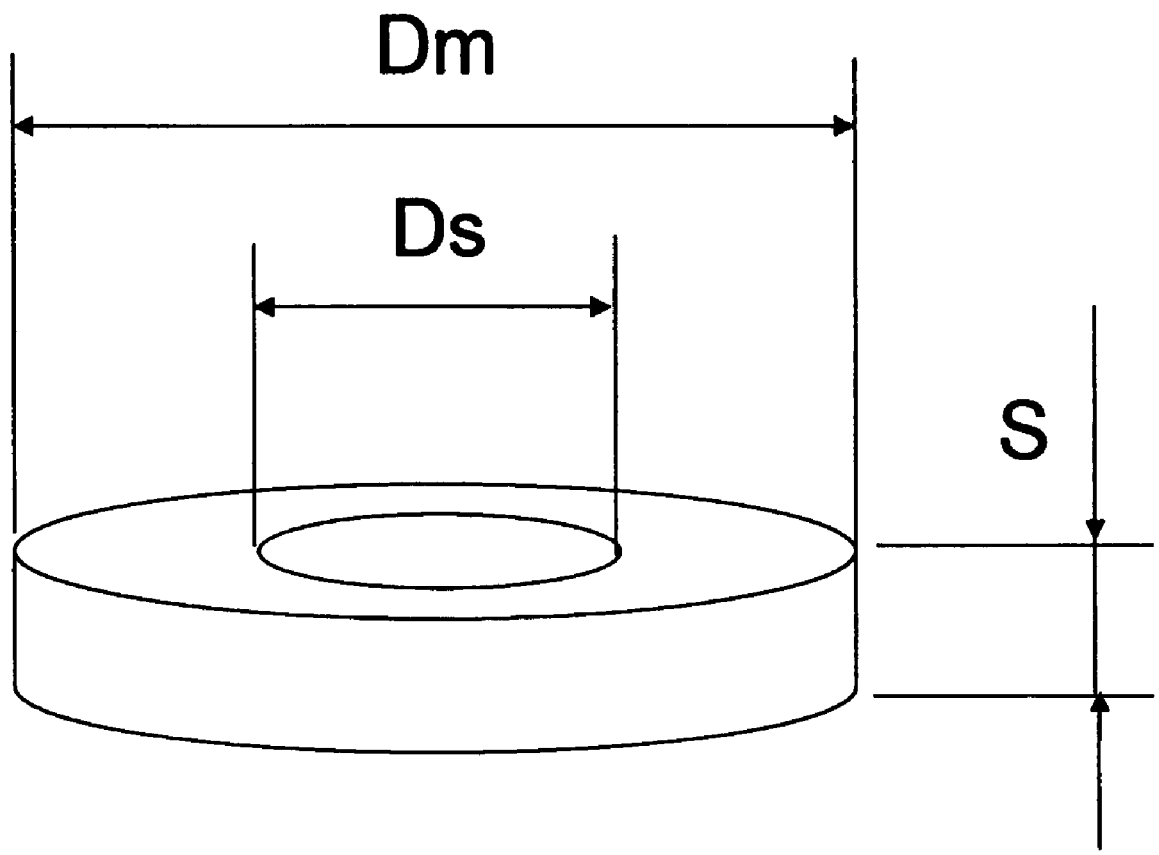
FIG. 10 is a diagram defining capillary pressures.

FIG. 10 shows a shape of a portion of the maximum gap S1 under the lower surface of the hub 7 of FIG. 3. Capillary pressure (Ps1) in such an example is defined by following equation set 2.

Regarding Ps1, the first lubricant reservoir is considered to have a shape substantially like a thin disc plate (see FIGS. 3 and 10).

$$Fs1 = 2\pi \times Ds \times \gamma \times \cos\theta \quad (7)$$

$$As1 = \pi \times Ds \times S1 \quad (8)$$

$$Ps1 = Fs1/As1 \quad (9)$$

Ds: Inner diameter of lubricant reservoir having maximum gap S1 [m]
S1: Maximum gap of lubricant reservoir between sleeve and hub [m]
Ps1: Capillary pressure [pascal]

Specifically, when Ds=0.003 [m] and S1=0.00003 [m], the pressure value of P is about 1900 [pascal].

In the hydrodynamic bearing designed as described above, when the lubricant circulates from the first gap in the direction toward the communication hole, bubbles generated in or entered into the bearing pass through the circulation passage from the first gap to the communication hole and the first lubricant reservoir and are discharged from the hydrodynamic bearing portion. Then, the bubbles reach the first lubricant reservoir and move to the second lubricant reservoir to be discharged outside.

When the lubricant circulates from the communication hole in the direction toward the first gap, bubbles pass through the circulation passage from the communication hole to the first gap and the first lubricant reservoir and are discharged from the hydrodynamic bearing portion. Then, the bubbles move to the second lubricant reservoir and are discharged outside.

In the above description, the dimension of the bearing is defined in view of the capillary pressures. In the above description, a specific calculation example in which the capillary pressures satisfy the relationship Pg1>Ps1>Pg2, and also the widths of the gaps (g1, s1 and g2) satisfy the relationship g1<s1<g2 is described. However, the results obtained from the present invention are not limited to such an example. It is shown that an example in which the capillary pressures satisfy the relationship Pg1>Ps1>Pg2, but the widths of the gaps (g1, s1 and g2) do not satisfy the relationship g1<s1<g2 can also discharge bubbles smoothly.

Figure 14:
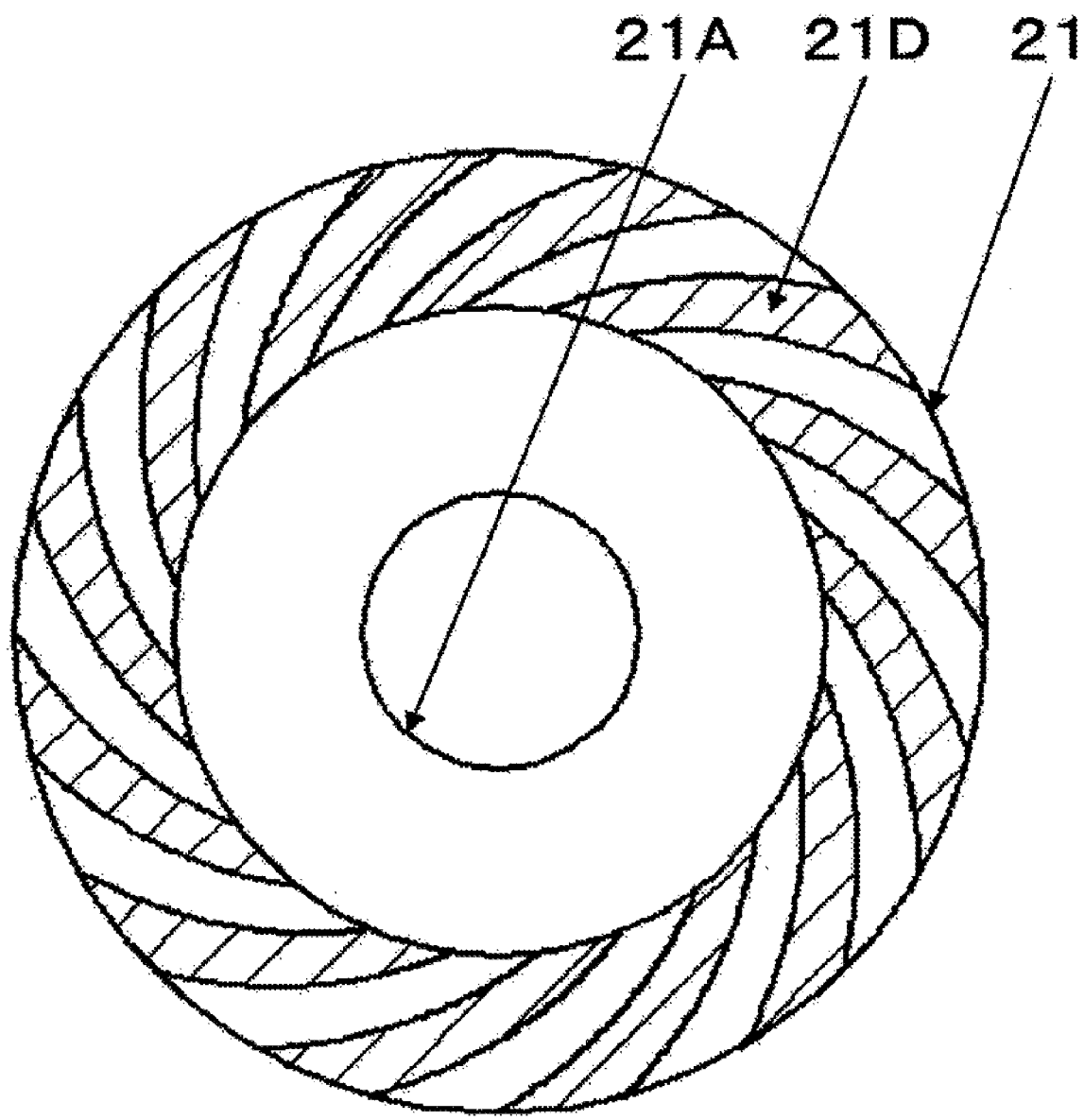
FIG. 14 is an enlarged diagram showing thrust grooves of the conventional hydrodynamic bearing.
Figure 15:
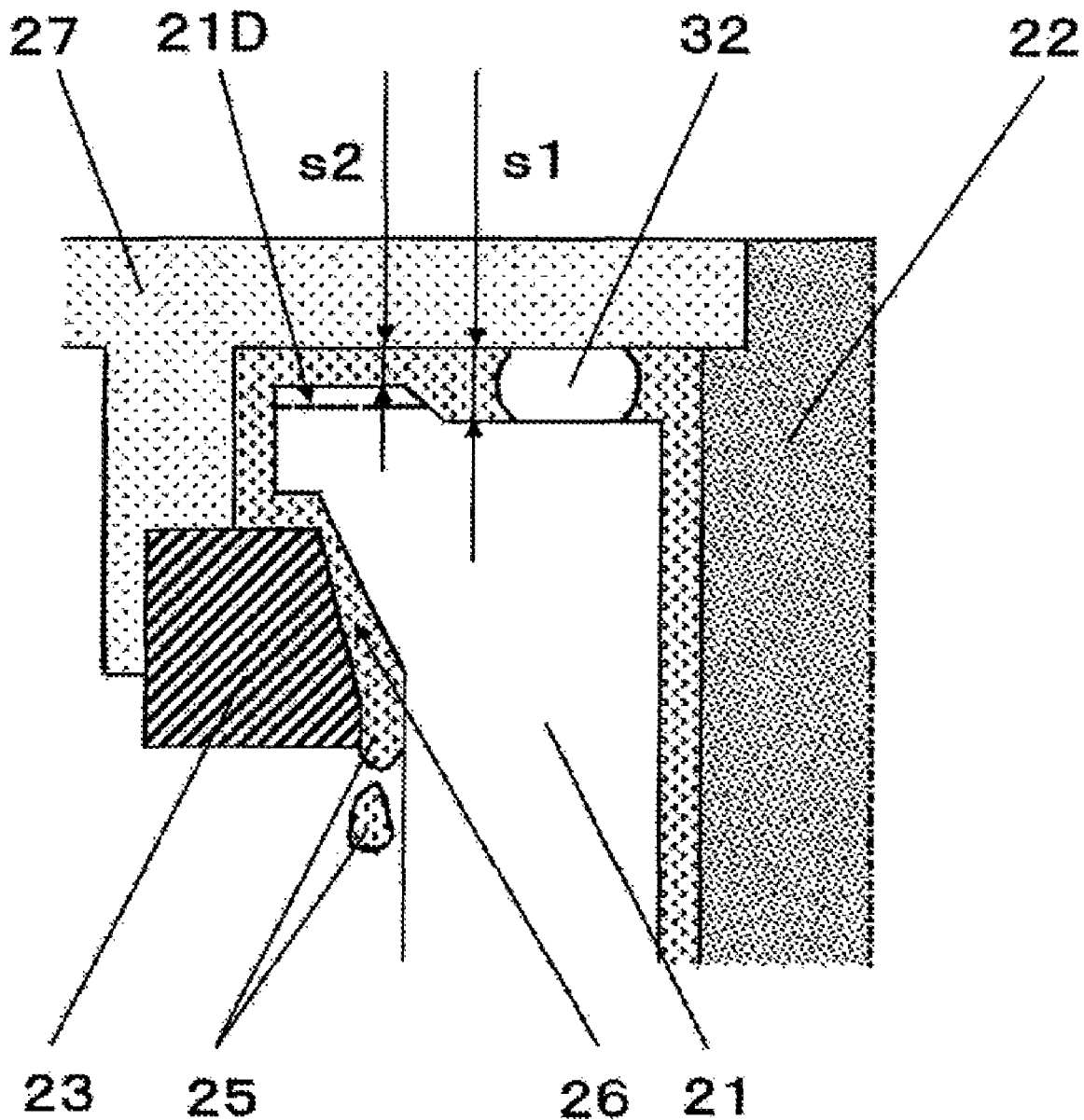
FIG. 15 is a detailed diagram of an oil reservoir portion of the hydrodynamic bearing.
Figure 16:
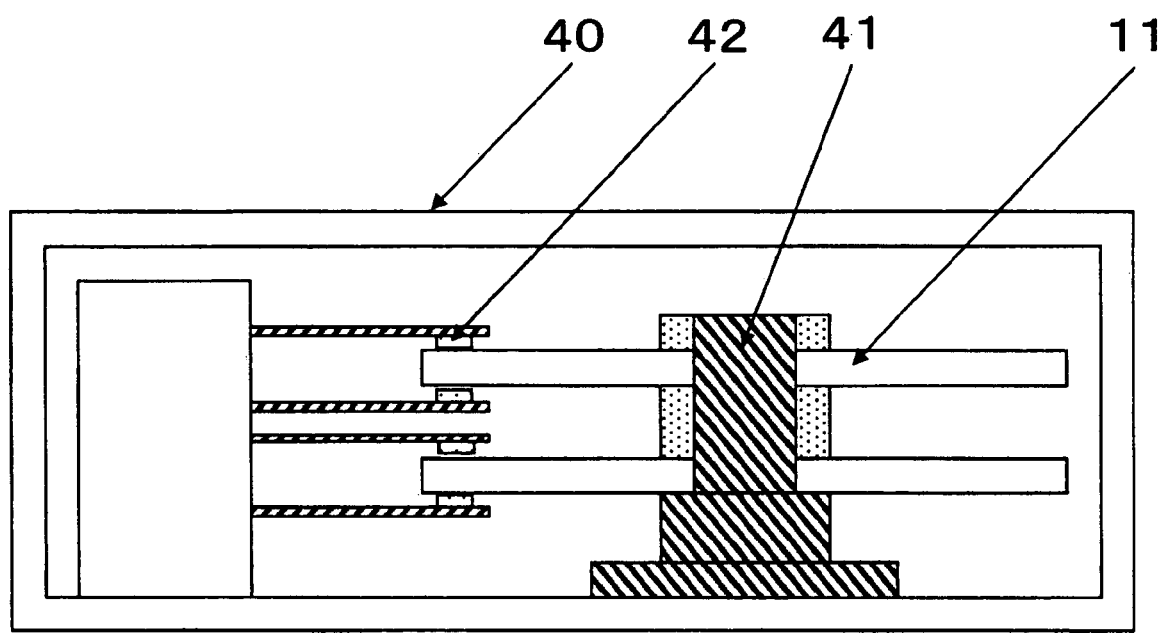
FIG. 16 is a cross-sectional diagram of a recording and reproducing apparatus.

As necessary, the thrust hydrodynamic grooves 2A may be provided as thrust hydrodynamic grooves 1G on a surface of the sleeve 1 which opposes the hub. In such an example, the thrust hydrodynamic grooves 1G have a similar pattern as the thrust hydrodynamic grooves 211) of the conventional example shown in FIG. 14. In this example, it is desirable that hydrodynamic pressures generated by the thrust hydrodynamic grooves 1G and working toward the bearing cavity do not prevent movement of the bubbles.

In the present embodiment, the stopper member 3 and the sleeve 1 has the structure as shown in FIG. 3. However, structures shown in FIG. 12 as the stopper 15 and the sleeve 13 may be employed.

In the present embodiment, the sleeve is formed of an outer sleeve and an inner sleeve. However, it may be formed integral rather than being separated into the outer sleeve and the inner sleeve.

With the structure as described above, the device can be operated without bubbles entering into the hydrodynamic bearing surfaces and without oil film rupture. Thus, the shaft 2 can be rotated in a non-contact state with respect to the sleeve 1 and the thrust plate 4. With a magnet head or an optical head (not shown), data can be recorded/reproduced to/from a rotating disc 10.

Second Embodiment

Figure 11:
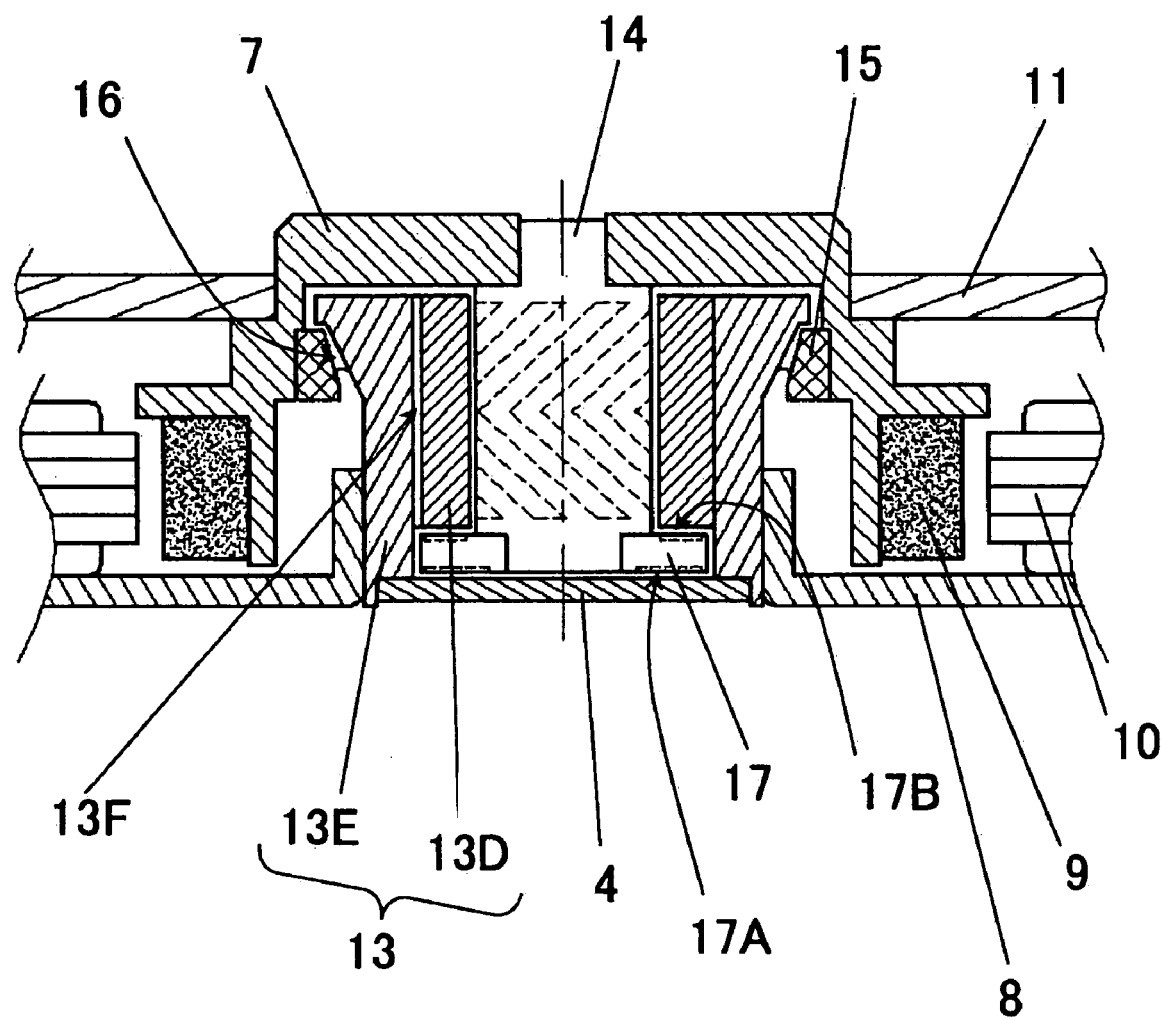
FIG. 11 is a cross-sectional view of a hydrodynamic bearing according to second embodiment of the present invention.
Figure 12:
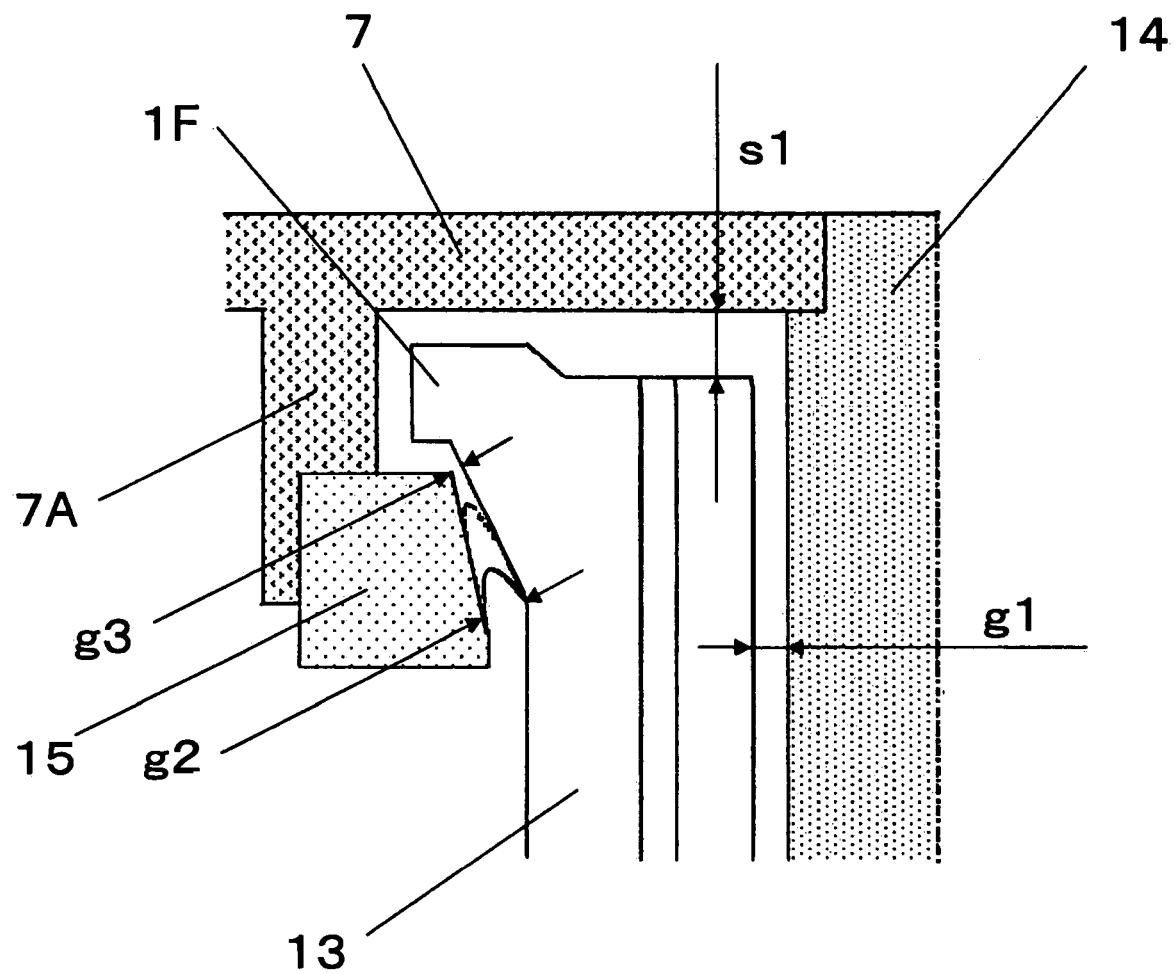
FIG. 12 is a detailed diagram of an oil reservoir portion of the hydrodynamic bearing.

FIGS. 11 and 12 are cross sectional diagrams of the hydrodynamic bearing type rotary device according to the present embodiment.

As shown in FIG. 11, a flange 17 is attached to a lower end of a shaft 14. One surface of the flange 17 opposes a sleeve 13. On at least one of these opposing surfaces, thrust hydrodynamic grooves 17B are formed so as to form a second thrust bearing. The other surface of the flange 17 opposes the thrust plate 4. On at least one of these opposing surfaces, thrust hydrodynamic grooves 17A are formed so as to form a first thrust bearing. The sleeve 1 is formed by fixing a sintered sleeve 13D and a sleeve collar 13E by press fitting, adhering, or the like. The sintered sleeve 13D is formed by sintering and molding metal powder. The sleeve collar 13E forms an inner sleeve made of a thermoplastic resin or the like. A vertical groove 13F provided on an outer peripheral surface of the sintered sleeve 13D has similar functions as the communication hole 1C in FIG. 2.

In the present embodiment, the sleeve 13 is formed of an outer sleeve and an inner sleeve made of different materials. However, they may be made of the same material such as copper alloy. Alternatively, they may be integrally formed rather than being separated into the outer sleeve and the inner sleeve.

Operations of the hydrodynamic bearing type rotary device of the present invention shown in FIG. 11 is almost the same as those of the hydrodynamic bearing type rotary device of the first embodiment shown in FIG. 2. The pressures generated at the thrust hydrodynamic grooves 17A and 17B are generated respectively in directions opposite from one another. The thickness of the oil films is defined where the forces in opposite directions are balanced.

In the present embodiment, two sets of thrust hydrodynamic grooves, i.e., the thrust hydrodynamic grooves 17A and 17B are formed. Since both of them generate pressures, the thrust bearings have high stiffness and high performance.

Figure 13:
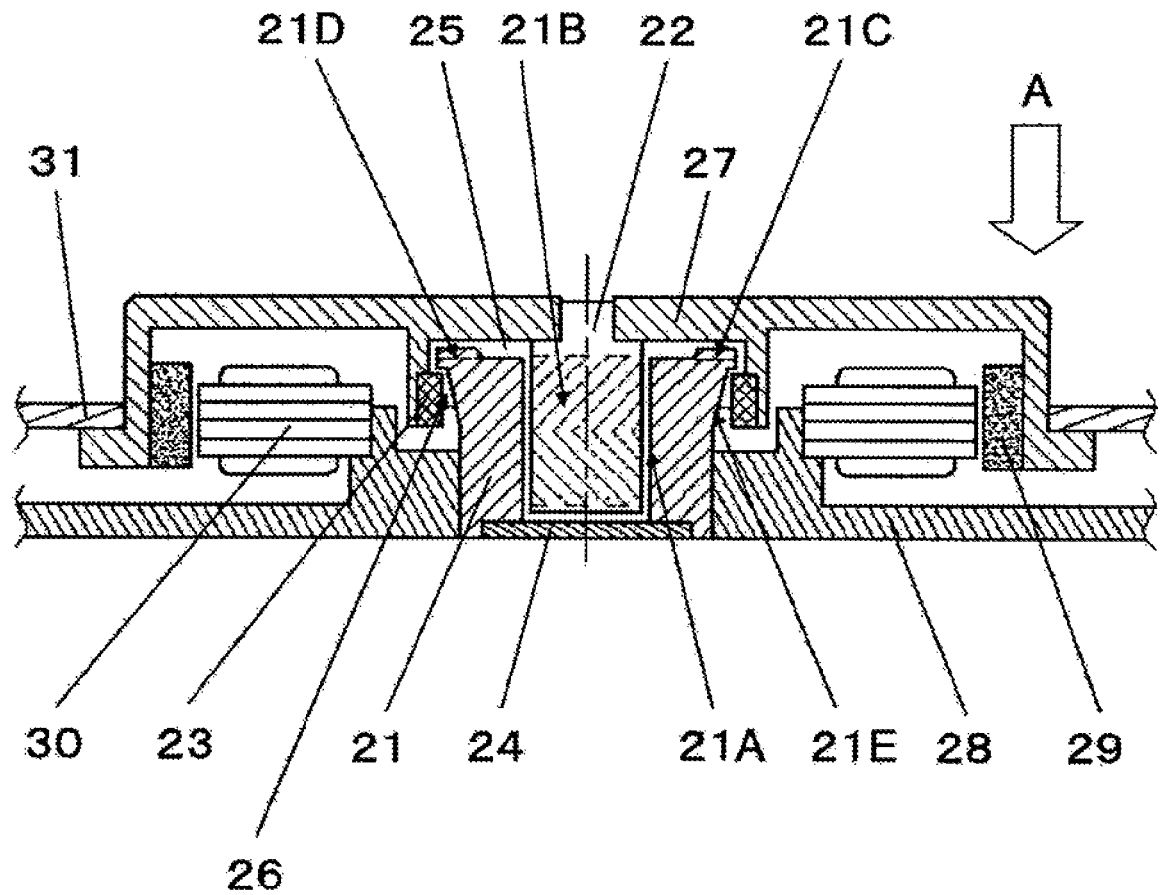
FIG. 13 is a cross-sectional view of a conventional hydrodynamic bearing.

Alternatively, as shown in FIG. 13, a thrust bearing 21C may be provided under the lower surface of the hub. Even in such an example, similar effects as those of the first embodiment shown in FIG. 2 can be achieved by maintaining the relationship among the gap widths or the capillary pressures of the gaps as a predetermined relationship.

With such a hydrodynamic bearing, similar functions and effects as those of the hydrodynamic bearing of the first embodiment described above can be achieved.

In the present invention, the sleeve 1 is formed of pure iron, stainless steel, copper alloy or the like. The shaft 2 is formed of stainless steel or the like and has a diameter of 2 to 5 mm. The lubricant 5 is ester oil with low viscosity or the like (or may be high-fluidity grease or ionic liquids).

As described above, according to the present invention, conditions in designing the bearing which allows no bubble to be trapped in the bearing cavity can be set precisely. Alternatively, the bubbles can be discharged from the bearing gaps by setting such conditions for designing. Therefore, when such bearings are used for the disc rotary devices, no gas is generated from the lubricant 5 in the bearing. Thus, in the disc rotary devices with high recording density and high reliability can be obtained. Furthermore, according to the present embodiment, the lubricant 5 is securely confined to the bearing cavity. Thus, there is substantially no gas discharged from the lubricant 5. Even a lubricant having a low viscosity which is more likely to evaporate compared to the conventional lubricants is used, no gas flow out from the hydrodynamic bearing rotary device. This enables use of a lubricant having a viscosity as low as 8 centipoises (cP) at 40° C. In this way, loss torque due to rotational friction of the bearing can be reduced to reduce the current consumption of the disc rotary device.

As a result, a recording and reproducing apparatus 40 which includes the hydrodynamic bearing type rotary device described above as a spindle motor 41 and communicate information by having a recording and reproducing head 42 access to the disc 11 can stably perform recording and reproduction operations.

The present invention has an effect of providing hydrodynamic bearing type rotary device which can prevent oil film rupture and deterioration of NRRO at hydrodynamic grooves and which has high performance and reliability. Thus, it is widely applicable to a variety of hydrodynamic bearing type rotary devices which have a bearing portion including hydrodynamic grooves.

The invention claimed is:

1. A hydrodynamic bearing type rotary device, comprising:
a sleeve having a bearing hole,
a shaft which is inserted into the bearing hole of the sleeve so as to be rotatable;
a hub which is attached to one end of the shaft;
a first lubricant reservoir which is formed between the hub and an end surface of the sleeve and which has a maximum gap s1;
a radial bearing in which radial hydrodynamic grooves are formed on at least one of an outer peripheral surface of the shaft or an inner peripheral surface of the sleeve, and which has a gap g1; and
a second lubricant reservoir which has a maximum gap g2 between an outer peripheral surface of the sleeve and an inner peripheral surface of the hub, the inner peripheral surface of the hub having an inner diameter slightly larger than the outer peripheral surface of the sleeve or an inner peripheral surface of a stopper member attached to the hub, wherein:
a lubricant is held in the radial bearing, the first lubricant reservoir and the second lubricant reservoir; and
parameters of the gaps (Pg1, Ps1, Pg2) have the relationship which satisfy the following relational expression (B):

$$Pg1 > Ps1 > Pg2 \quad \text{(B), in which,}$$

when the lubricant reservoir has a substantially tubular shape, Pg1 and Pg2 are defined as follows:

$$Fgo = \pi \times Do \times \gamma \times \cos\theta \quad (1)$$

$$Fgi = \pi \times Di \times \Gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m], and
when the lubricant reservoir has a substantially thin disc shape, Ps1 is defined as follows:

$$Fs1 = 2\pi \times Ds \times \gamma \times \cos\theta \quad (7)$$

$$As1 = \pi \times Ds \times S1 \quad (8)$$

$$Ps1 = Fs1/As1 \quad (9)$$

Ds: Inner diameter of lubricant reservoir having maximum gap S1 [m]
S1: Maximum gap of the lubricant reservoir between sleeve and hub [m].

2. The hydrodynamic bearing type rotary device according to claim 1, wherein:
another end of the shaft is processed to have a surface at substantially right angles to an axis;
a thrust plate provided so as to oppose the surface of the another end is fixed to the sleeve to form a thrust bearing surface; and
hydrodynamic grooves configured to hold a lubricant are formed on at least one of the thrust bearing surface and the surface of the another end.

3. The hydrodynamic bearing type rotary device according to claim 1, wherein:
a flange is attached to another end of the shaft;
a second surface of the flange has a second thrust bearing surface which opposes a lower end surface of the sleeve, and a first surface of the flange has a first thrust bearing surface which opposes the thrust plate;

a thrust plate is fixed to the sleeve; and hydrodynamic grooves configured to hold the lubricant are formed on at least one of the first and second surfaces of the flange.

4. The hydrodynamic bearing type rotary device according to claim 1, further comprising hydrodynamic grooves on at least one of a surface of the hub and a sleeve upper end surface which oppose one another to form a third thrust bearing surface.

5. The hydrodynamic bearing type rotary device according to claim 1, further comprising:

at least one communication hole provided substantially parallel to the bearing hole with the radial hydrodynamic grooves communicating with both ends thereof, wherein at least the communication hole and the radial hydrodynamic grooves form a circulation passage into which the lubricant is injected and circulates therethrough, and the radial hydrodynamic grooves are formed in an asymmetrical groove pattern which generates a force to carry the lubricant.

6. A recording and reproducing apparatus, comprising the hydrodynamic bearing type rotary device according to claim 1.

7. A hydrodynamic bearing type rotary device, comprising:

a sleeve having a bearing hole, a shaft which is inserted into the bearing hole of the sleeve so as to be rotatable;

a hub to be attached to one end of the shaft;

a first lubricant reservoir which is formed between the hub and an end surface of the sleeve and which has a maximum gap s1;

a radial bearing in which radial hydrodynamic grooves are formed on at least one of an outer peripheral surface of the shaft or an inner peripheral surface of the sleeve, and which has a gap g1; and a second lubricant reservoir configured to have a maximum gap g2 between an outer peripheral surface of the sleeve and an inner peripheral surface of the hub, the inner peripheral surface of the hub having an inner diameter slightly larger than the outer peripheral surface of the sleeve or an inner peripheral surface of a stopper member attached to the hub, wherein:

a lubricant is held in the radial bearing, the first lubricant reservoir and the second lubricant reservoir; and the gaps (g1, s1, g2) have widths which satisfy the following relational expression (A):

$$g1 < s1 < g2 \qquad (A).$$

8. The hydrodynamic bearing type rotary device according to claim 7, wherein:

another end of the shaft is processed to have a surface at substantially right angles to an axis;

a thrust plate provided so as to oppose the surface is fixed to the sleeve to form a thrust bearing surface; and hydrodynamic grooves configured to hold a lubricant are formed on at least one of the surface of the another end of the shaft and the surface of the thrust plate.

9. The hydrodynamic bearing type rotary device according to claim 7, wherein:

a flange is attached to another end of the shaft;

a second surface of the flange has a second thrust bearing surface which opposes a lower end surface of the sleeve, and a first surface of the flange has a first thrust bearing surface which opposes the thrust plate;

the thrust plate is fixed to the sleeve; and hydrodynamic grooves configured to hold the lubricant are on at least one of the first and second surfaces of the flange.

10. The hydrodynamic bearing type rotary device according to claim 7, further comprising hydrodynamic grooves on at least one of a surface of the hub and a sleeve upper end surface which oppose one another to form a third thrust bearing surface.

11. The hydrodynamic bearing type rotary device according to claim 7, further comprising:

at least one communication hole provided substantially parallel to the bearing hole with the radial hydrodynamic grooves communicating with both ends thereof, wherein at least the communication hole and the radial hydrodynamic grooves form a circulation passage into which the lubricant is injected and circulates therethrough, and the radial hydrodynamic grooves are formed in an asymmetrical groove pattern which generates a force to carry the lubricant.

12. A recording and reproducing apparatus, comprising the hydrodynamic bearing type rotary device according to claim 7.

* * * * *